United States Patent
Fannin et al.

(10) Patent No.: US 11,150,653 B1
(45) Date of Patent: Oct. 19, 2021

(54) AUTOPILOT AVAILABILITY FOR REDUCED CREW OPERATIONS SYSTEM AND METHOD

(71) Applicant: Rockwell Collins, Inc., Cedar Rapids, IA (US)

(72) Inventors: Timothy R. Fannin, Urbana, IA (US); Keith A. Stover, Lisbon, IA (US); Eric N. Anderson, Marion, IA (US); Andrew R. Markofski, Cedar Rapids, IA (US); James E. Walton, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 397 days.

(21) Appl. No.: 16/380,667

(22) Filed: Apr. 10, 2019

(51) Int. Cl.
*G05D 1/10* (2006.01)
*G05D 1/00* (2006.01)
*B64D 45/00* (2006.01)
*G05D 1/08* (2006.01)
*G05D 1/04* (2006.01)

(52) U.S. Cl.
CPC .......... *G05D 1/0077* (2013.01); *B64D 45/00* (2013.01); *G05D 1/0061* (2013.01); *G05D 1/042* (2013.01); *G05D 1/0808* (2013.01); *B64D 2045/0085* (2013.01)

(58) Field of Classification Search
CPC .. G05D 1/0061; G05D 1/0808; G05D 1/0077; G05D 1/042; B64D 2045/0085; B64D 45/00
See application file for complete search history.

(56) References Cited

U.S. PATENT DOCUMENTS

| | | | | |
|---|---|---|---|---|
| 2006/0249625 | A1* | 11/2006 | Matos | B64C 13/24 244/118.5 |
| 2012/0092193 | A1* | 4/2012 | Perrie | G05D 1/0077 340/979 |
| 2012/0097800 | A1* | 4/2012 | Burroughs | B64C 13/345 244/197 |
| 2014/0027564 | A1* | 1/2014 | Mercer | B64C 13/341 244/17.13 |
| 2017/0088285 | A1* | 3/2017 | Wischmeyer | G08G 5/0065 |

* cited by examiner

*Primary Examiner* — Russell Frejd
*Assistant Examiner* — Demetra R Smith-Stewart
(74) *Attorney, Agent, or Firm* — Suiter Swantz pc llo

(57) ABSTRACT

A system and related method operates to receive autopilot selection and monitor aircraft systems to control which autopilot is actively flying the aircraft. During certain flight operations in which a single autopilot is in use, the system reverts to the next available autopilot should the active and selected autopilot disconnect for any reason (e.g., faults and/or failures). The system maintains a redundant ability for pilot use of each pilot selectable mode of each autopilot channel including altitude hold, speed hold, heading hold, etc. For an indication to a pilot or remote operator that the system has reverted to a second autopilot, the system commands a momentary aural warning and a visual message/lights. For failures resulting in timely but necessary maneuver requirements, the system maintains autopilot control laws, control authority and roll authority.

20 Claims, 5 Drawing Sheets

AUTOPILOT AVAILABILITY FOR REDUCED CREW OPERATIONS SYSTEM AND METHOD

BACKGROUND

Most Autopilot (AP) system designs result in an automatic autopilot disconnect when the AP system senses a failure in an associated system (e.g., electrical power, hydraulics, sensors, servos). When the AP disconnects, the aircrew must change a mindset from system monitoring to active aircraft flying then engage a different AP should one be available. This resulting temporary increase in workload to manually fly or engage a different autopilot channel is acceptable with two crewmembers present in the flight deck. However, reduced crew operations providing a single crewmember is available in the flight deck may greatly increase workload and stress for the single pilot.

Single pilot or unmanned flight operations may require significant redundancy in AP system availability for safety as well as compliance with a certification authority. An AP system failure or crewmember incapacitation during flight may lead to catastrophic results.

Therefore, a need remains for a system and related method which may overcome these limitations and provide a redundant and automatic autopilot engagement should a first autopilot system disconnect or fail.

SUMMARY

In one aspect, embodiments of the inventive concepts disclosed herein are directed to a system for autopilot availability onboard an aircraft. The system may comprise two or more autopilots configured to manipulate a control surface onboard an aircraft. For control, the system may include an autopilot controller associated with each autopilot of the autopilots, each autopilot controller configured for a crosstalk with each of the other autopilot controllers. To sense a failure, the system may employ a sensor operatively coupled with each autopilot controller and configured to monitor a disconnect factor associated with the aircraft.

For function of the controllers, the system may employ a tangible, non-transitory memory associated with each autopilot controller, the tangible, non-transitory memory having instructions stored therein that, in response to execution by the autopilot controller, cause the autopilot controllers collectively to perform the system functions.

In one embodiment, the system may function to receive an engagement command and engage the commanded autopilot from the two autopilots. While engaged, the system may continuously monitor the sensor for the disconnect factor and continuously crosstalk with the each of the other autopilot controllers. Should a failure occur, the system may receive a failure indication from the sensor, the failure indication specific to the disconnect factor and determine an autopilot hierarchy based on the disconnect factor and the crosstalk. Once the system determines the hierarchy, the system may engage a next autopilot from the autopilots on the autopilot hierarchy.

A further embodiment of the inventive concepts disclosed herein may be directed to a method for autopilot availability onboard an aircraft. The method may comprise receiving an engagement command to engage an autopilot from two or more autopilots, each of the autopilots configured for manipulating a flight control surface onboard the aircraft and engaging the commanded autopilot from the two autopilots. For monitoring, the method may continuously monitor a sensor for a disconnect factor and continuously crosstalk with each autopilot of the autopilots. The method may function by receiving a failure indication from the sensor, the failure indication specific to the disconnect factor and determining an autopilot hierarchy based on the disconnect factor and the crosstalking. The method may further function with engaging a next autopilot from the autopilots on the autopilot hierarchy.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
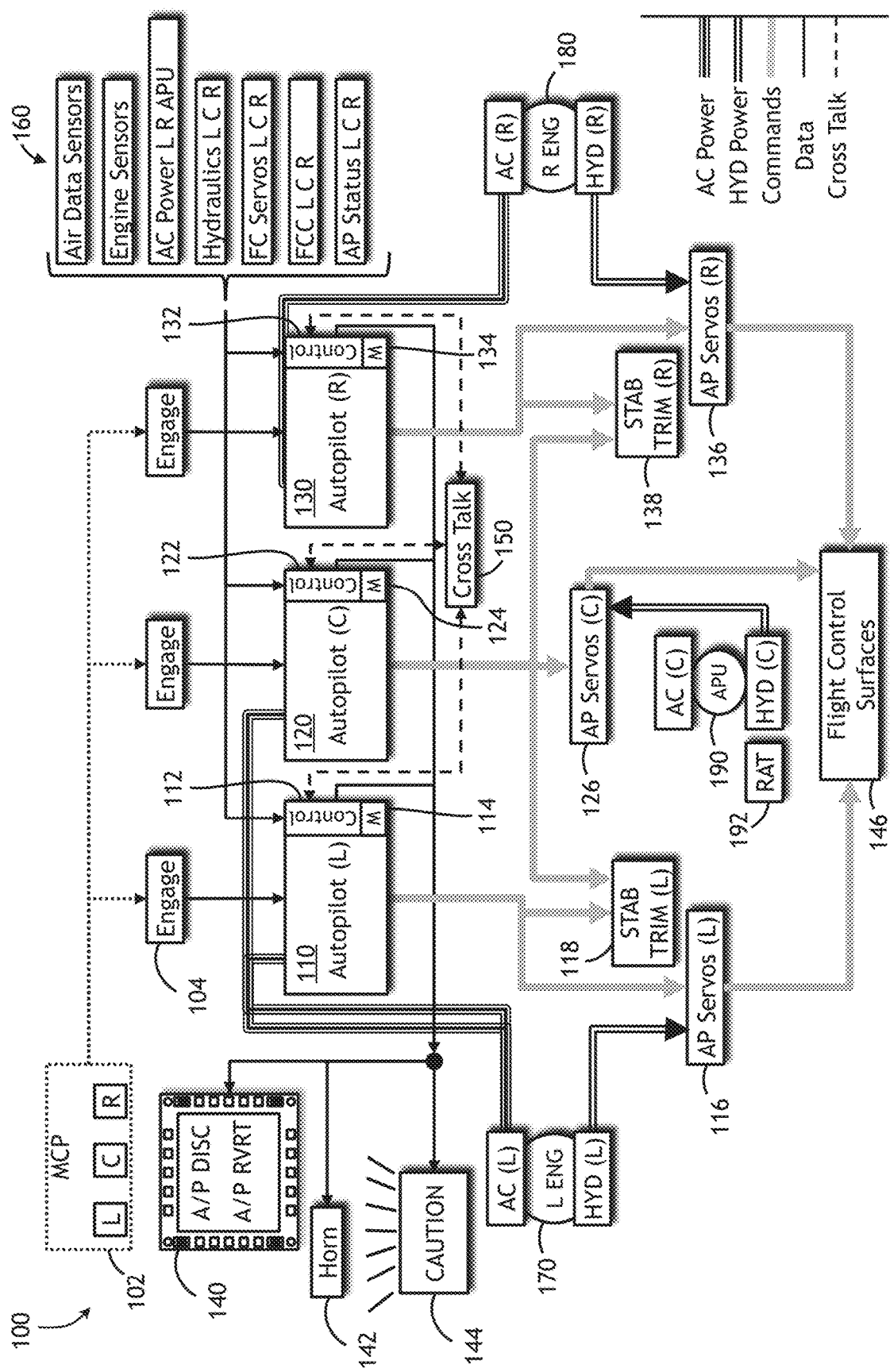
FIG. 1 is a diagram of an overall system architecture for autopilot availability in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and related method operates to receive autopilot selection and monitor aircraft systems to control which autopilot is actively flying the aircraft. During certain flight operations in which a single autopilot is in use, the system reverts to the next available autopilot should the active and selected autopilot disconnect for any reason (e.g., faults and/or failures). The system maintains a redundant ability for pilot use of each pilot selectable mode of each autopilot channel including altitude hold, speed hold, heading hold, etc. For an indication to a pilot or remote operator that the system has reverted to a second autopilot, the system commands a momentary aural warning and a visual message/lights. For failures resulting in timely but necessary maneuver requirements, the system maintains autopilot control laws, control authority and roll authority.

| Reference Chart | |
|---|---|
| 100 | System Architecture |
| 102 | Mode Control Panel |
| 104 | Engagement Command |
| 110 | Left AP |
| 112 | Left AP Controller |
| 114 | Left AP Memory |
| 116 | Left AP Servos |
| 118 | Left Stab Trim |

-continued

| Reference Chart | |
|---|---|
| 120 | Center AP |
| 122 | Center AP Controller |
| 124 | Center AP Memory |
| 126 | Center AP Servos |
| 130 | Right AP |
| 132 | Right AP Controller |
| 134 | RIght AP Memory |
| 136 | Right AP Servos |
| 138 | Right Stab Trim |
| 140 | Multi-Function Display |
| 142 | Horn |
| 144 | Master Caution Light |
| 146 | Flight Control Surfaces |
| 150 | Cross Talk |
| 160 | Sensor Suite |
| 170 | Left Engine |
| 180 | Right Engine |
| 190 | APU |
| 192 | RAT |
| 200 | System for Autopilot Availability |
| 300 | Logic Flow |
| 302 | Engage Commanded AP |
| 304 | Monitor Sensor |
| 306 | Establish Crosstalk |
| 308 | Query - Sensor shows Failure |
| 310 | Establish Hierarchy |
| 312 | Reference Crosstalk |
| 314 | Engage Next AP |
| 400 | Diagram of Hierarchy |
| 410 | Exemplary Hierarchy |
| 500 | Method Flow |
| 502 | Receive Engagement Command |
| 504 | Engage AP |
| 506 | Monitor Sensor |
| 508 | Crosstalk |
| 510 | Receive Failure from Sensor |
| 512 | Determine Hierarchy |
| 514 | Engage Next AP |

FIG. 1 System

Referring to FIG. 1, a diagram of an overall system architecture for autopilot availability in accordance with an embodiment of the inventive concepts disclosed herein is shown. The overall system architecture for AP availability 100 may function to implement mode control logic within each AP to ensure a functioning AP is available to manipulate aircraft control surfaces for safety of flight.

The overall system architecture for AP availability 100 may include two or more AP for selection and engagement should a currently engaged AP disengage. Shown here, an exemplary system including three AP channels including a left AP 110, a center AP 120, and a right AP 130 available for selection and engagement. Each of the AP may further include an associated AP controller 112 122 132 as well as an associated AP memory 114 124 134.

As used herein, the term aircraft may apply to any vehicle designed to maneuver through the air, including piloted, remotely piloted, airplanes, helicopters, rotorcraft, and unmanned aerial vehicles. The overall system architecture for AP availability 100 may directly apply to AP function onboard any aerial vehicle.

Shown in FIG. 1, an exemplary tri-plex (three) AP system may be indicated. However, an aircraft using a lesser or greater number of AP systems or channels may fall directly within the scope of the inventive concepts disclosed herein. For pilot engagement of one of the AP channels, a mode control panel 102 may function as a user interface for initial pilot-controlled AP selection and engagement via an engagement command 104. Contemplated herein, initial AP selection may result from a computer-based command in the case of an autonomous aircraft as well as a remote command in the case of a remotely operated vehicle.

Overall system architecture for AP availability 100 may function independently of a number of flight crewmembers engaged in flying the aircraft. In one embodiment of the inventive concepts disclosed herein, the overall system architecture for AP availability 100 may function on a multi crew aircraft reducing a workload for each pilot during a system failure. Also, the system for AP availability 100 may function on aircraft maintaining a reduced crew operation including a single piloted or remotely piloted aircraft. Further, the system for AP availability 100 may directly apply to an autonomous aircraft making an AP channel available to a computer functioning as the pilot of the autonomous aircraft.

Power Sources

Each AP 110 120 130 may receive power from a single or redundant electrical power source. As the system architecture 100 may provide automatic redundancy in AP selection, it is important to note each AP channel receives power from an alternate source. Here, a left engine 170 may drive a left AC generator providing power to each of the left AP 110 and the center AP 120. A right engine 180 may similarly drive a right AC generator providing power to the right AP 130. The overall system architecture 100 may also provide redundancy in flight control actuation.

A set of left AP servos 116 may receive hydraulic power from a left engine driven hydraulic system and command inputs from the left AP channel 110. Similarly, a set of right AP servos 136 may receive hydraulic power from a right engine driven pump and command inputs from the right AP 130. Each set of servos 116 136 may then, in turn, provide the mechanical link to manipulate one or more of aircraft flight control surfaces 146. In one embodiment, the AP may function to manipulate a control surface configured to deflect an airflow to impart a force on at least one portion of the aircraft, a pitch and blade angle of at least one rotor, a motor speed, and an angle of thrust.

As used herein, the term control surface may refer to any device designed to influence an attitude or trajectory of, or supply lift or drag to, any aerial vehicle. Exemplary control surfaces onboard the aircraft may include an aileron, an elevator, an elevon, a rudder, a ruddervator, a roll trim device, a pitch trim device, a yaw trim device, a pitch of at least one main rotor, an angle of attack of at least one main rotor blade, a collective pitch supplied to a tail rotor, a direct jet thruster, a motor speed, a fan blade angle, a thrust vector angle, and a control function designed to influence a trajectory of the aircraft in at least one of a vertical direction, a horizontal direction, a lateral direction, a pitch, a roll, and a yaw.

Stabilizer (Stab) trim may be a vital control surface onboard an aircraft to maintain pitch control. As such, each of a left stab trim 118 and a right stab trim 138 may receive commands from redundant AP channels (here all three) to ensure stab trim availability for aircraft control. For example, the left stab trim 118 may receive commands from both the left AP channel 110 and the center AP channel 120. Similarly, the right stab trim 138 may receive redundant control from both the center AP 120 and the right AP 130.

A set of center AP servos 126 may be hydraulically powered by a center hydraulic system and commend inputs from the center AP 120. The center hydraulic system may maintain additional redundancy from an air driven Ram Air Turbine (RAT) 192 as well as from an Auxiliary Power Unit (APU) 190. Electrical redundancy may offer each separate hydraulic system a source of electrical power should one of the generators fail. However, a generator failure may be one of the disconnect factors discussed below. On some aircraft, one or more hydraulic systems may receive primary or secondary power from one of an air driven pump as well as additional types of pumps. The overall system architecture 100 may employ sensors within each of these vital systems to select the AP best suited for maximum aircraft control.

As a backup, some system architectures 100 may employ the APU 190 to power a backup AC generator for powering one or more electrical busses to provide electrical power to one or more AP channels. Here, the APU 190 may drive an AC generator capable of providing backup electrical power to the center AP 120. In this manner, should each engine driven generator fail, at least one AP channel may be available for the system 100 to auto select.

In one embodiment of the inventive concepts disclosed herein, the overall system architecture for AP availability 100 may include connectivity between each AP controller 112 122 132 via a crosstalk 150. In this manner, each AP controller may communicate with the other AP controllers to perform a number of functions.

The crosstalk 150 may comprise a collective control of each AP onboard the aircraft as well as a comparison of an AP health, an AP consistency, and an AP performance history. One function may include collectively determining which of the AP channels 110 120 130 is at the top of the AP hierarchy for engagement following a system failure.

Cross talk 150 may further include information intentionally shared between the AP channels within the overall system architecture for AP availability 100. Each AP 110 120 130 may share its current operational state information including active and armed modes (e.g., altitude hold, airspeed hold, heading hold, etc.), active and armed targets (e.g., speed, altitude, thrust), along with key health and status information for the AP. The cross talk 150 may also may include key input parameters (like airspeed) and health and status information from additional aircraft systems that may interface with the AP (e.g., flight management systems, engine indication and crew alerting systems, etc.). One exemplary piece of information the AP 110 120 130 may share includes each AP knows what the active AP is doing and can pick up where the active AP leaves off if the active AP may disconnect. Further, the cross talk 150 may enable sharing of sufficient information for the inactive APs to determine which one should be the next AP on the AP hierarchy and take over active aircraft flight control if the active AP may disconnect.

Sensors

A suite of sensors 160 may include exemplary sensors listed. However, a plurality of additional sensors related to aircraft control may fall directly within the scope of the inventive concepts disclosed herein. For example, air data sensors may include airspeed, altitude, and angle of attack sensors configured for measuring traditional air data parameters. Air data sensors may further monitor an Air Data Computer (ADC) stability, a rate of change of each air data parameter, a Radio Altimeter (RA), and an Attitude Heading reference System (AHRS). Engine sensors may include Engine Gas Temperature (EGT) sensors, RPM sensors, Fuel Flow (FF), and oil pressure sensors. AC power sensors may include voltage and frequency sensors coupled with each AC generator (e.g., left AC, right AC, APU AC) as well as monitoring each associated bus powered by each generator.

Hydraulics sensors may function to monitor hydraulic pressure and quantity in each hydraulic system and associated accumulator. Flight Control (FC) servos sensors LCR may include a plurality of sensors including a mechanical position of each flight control surface, inertial sensors, attitude sensors, and sensors measuring position and rotation of each axis of rotation (e.g., pitch roll yaw). Flight Control Computer (FCC) sensors may monitor each FCC to measure a health and function status of each. AP status may measure a status of each AP to include a health and function status of each installed AP.

The overall system architecture 100 may also include alert systems to announce to an operator or operating system a reversion to a second AP channel. A visual announcement on a Multi-Function Display (MFD) 140 may alert a human pilot of a reversion from a selected AP channel to a second AP channel. Similarly, a horn 142 and master caution light 144 may alert the human pilot. A remote operator may receive a similar message and alert albeit remote from the remotely piloted aircraft. An autonomous aircraft FCC may be alerted of the reversion and make decisions accordingly for flight continuation or divert.

FIG. 2 Function

Figure 2:
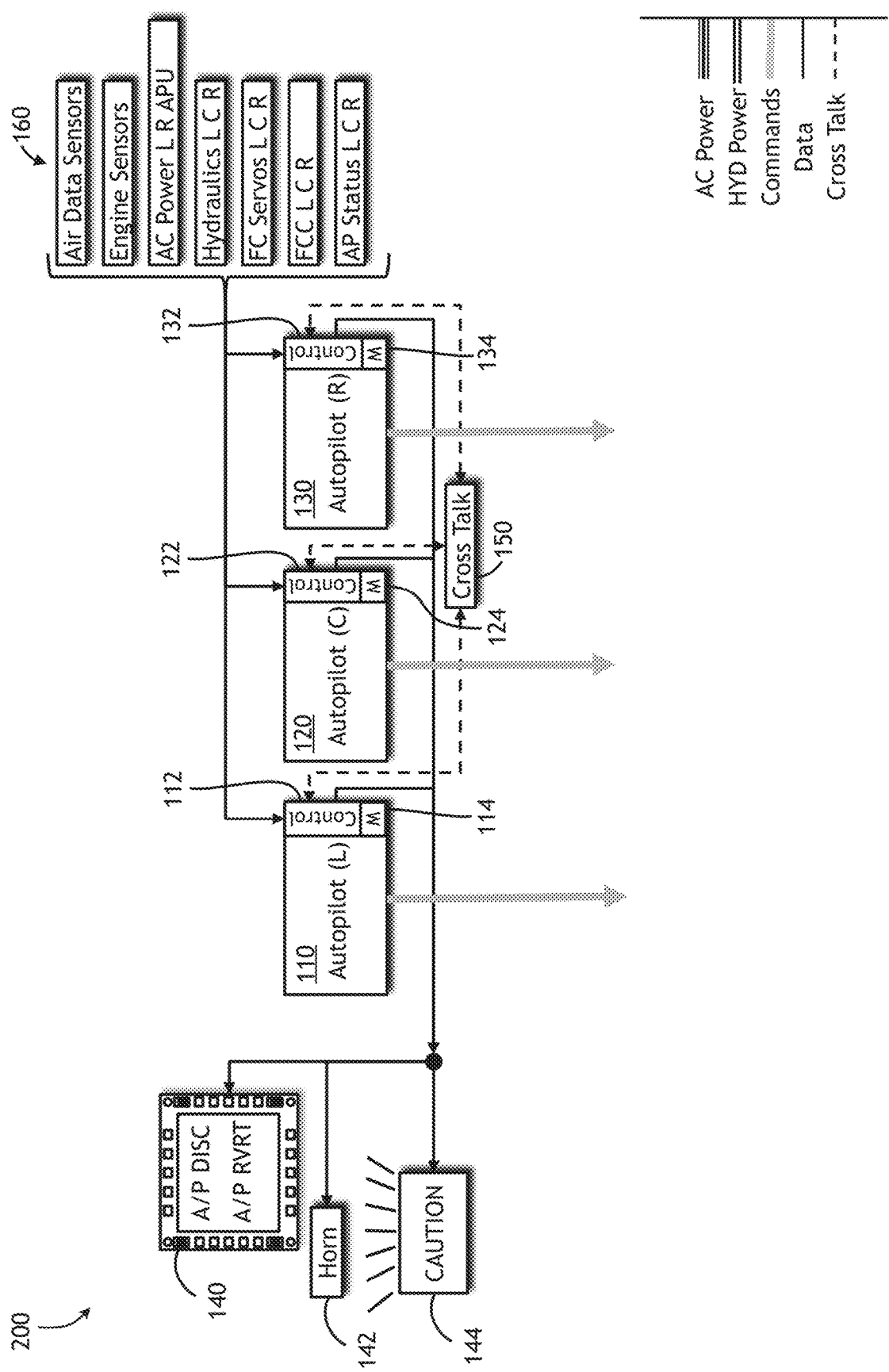
FIG. 2 is a diagram of a system for autopilot availability in accordance with an embodiment of the inventive concepts disclosed herein.

Referring now to FIG. 2, a diagram of a system for autopilot availability in accordance with an embodiment of the inventive concepts disclosed herein is shown. A system for AP availability 200 may be functional onboard an aircraft to ensure an operating AP is available to manipulate the aircraft flight controls 146.

The system for AP availability 200 may include more than one AP channel from which the system for AP availability 200 may select and engage to fly the aircraft. In one embodiment, more than one installed autopilot channel may allow the system to adequately ensure AP availability to manipulate the control surfaces onboard the aircraft. Typically, operators may desire engagement of a single AP during normal operations (e.g., climb, cruise, descent). For approach, typical architectures may engage all AP channels for increased safety.

The AP controllers 112 122 132 may collectively function to receive an engagement command and engage the commanded AP from the installed AP channels 110 120 130. Referencing the crosstalk 150 between each controller, the system for AP availability 200 may function to monitor each sensor of the sensor suite 160 for a disconnect factor associated with the aircraft. A disconnect factor associated with the aircraft may include a failure in an aircraft system which causes one of the autopilots to automatically disconnect. Such failure indication from the sensor suite 160 may also include a pending failure and a current failure. For example, one disconnect factor may include a loss of power of the right aircraft engine. As the right engine may begin to lose power, the engine sensor of the sensor suite 160 may recognize the loss of RPM below a predetermined value and send a signal to the controllers of the pending disconnect factor. The controllers 112 122 132 may execute instructions from the memory 114 124 134 to receive the failure indication from the sensor.

At this point, the commanded AP may still be actively flying the aircraft and the actual automatic autopilot disconnect has not yet occurred. The controllers 112 122 132 may function to determine an autopilot hierarchy based on the disconnect factor and the crosstalk. The AP hierarchy may be based on a next AP which may perform in a manner enabling maximized aircraft control. Here the disconnect factor of the right engine failure may lead the controllers to determine an AP hierarchy with the right AP at the bottom of the list. One exemplary AP hierarchy here may be center AP, left AP then right AP. The controllers 112 122 132 may then collectively select the center AP 120 as the next AP in the hierarchy from which to select and engage. In one embodiment, the on the autopilot hierarchy further comprises an engagement of all available AP systems. In one embodiment of the inventive concepts disclosed herein, the system for autopilot availability 200 may engage all remaining AP to enable maximum performance of each available AP channel.

The system for autopilot availability 200 may function to alert a crewmember of the reversion and engagement of the next AP channel. The alert may include an illumination of the master caution light 144, sounding an audible alarm such as the horn 142, and displaying a message on a flight crew display such as the MFD 140. Further the system for autopilot availability 200 may transmit an alert to a remote operator.

FIG. 3 Logic

Figure 3:
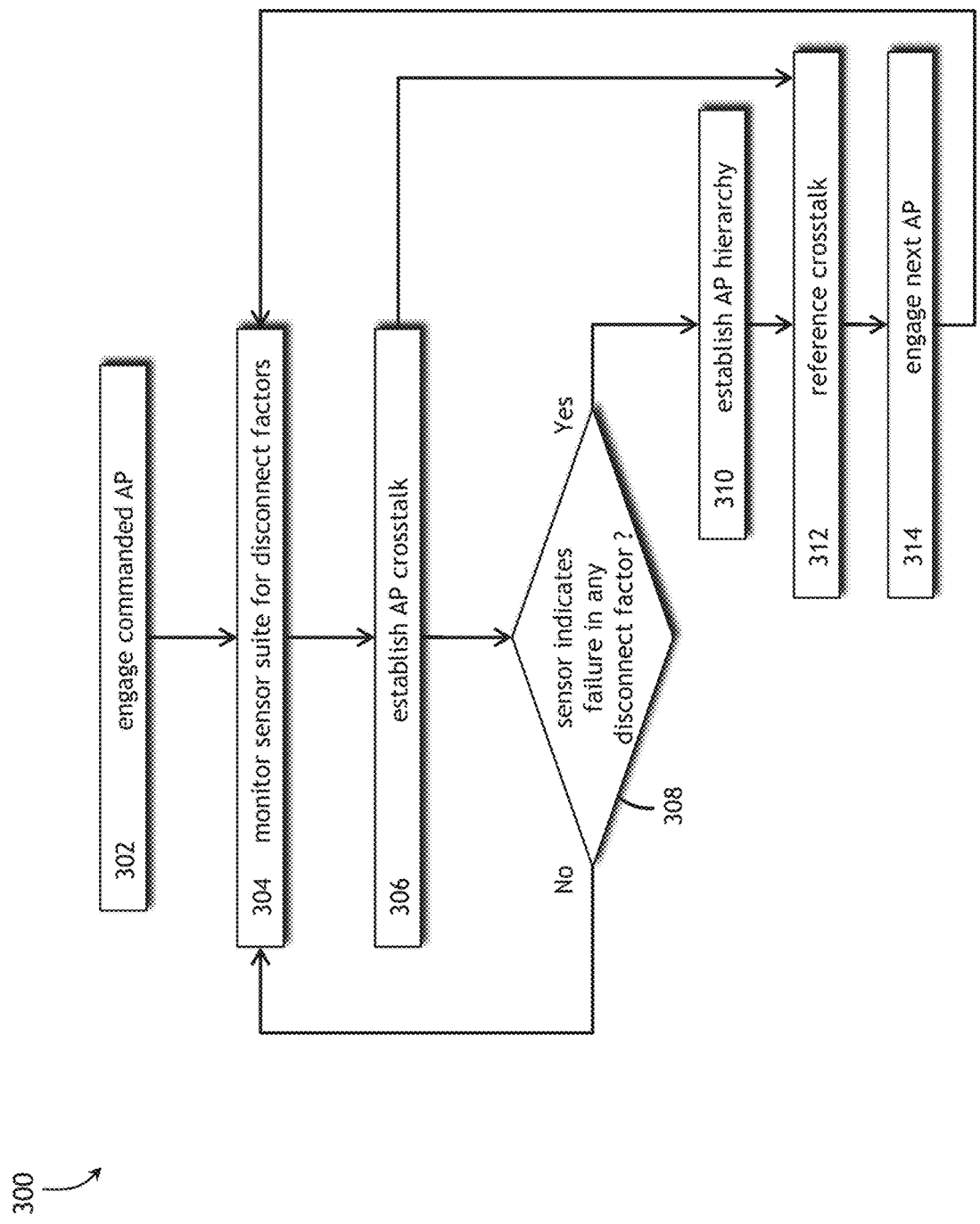
FIG. 3 is a diagram of a logic flow for autopilot availability exemplary of an embodiment of the inventive concepts disclosed herein.

Referring now to FIG. 3, a diagram of a logic flow for autopilot availability exemplary of an embodiment of the inventive concepts disclosed herein is shown. A logic flow 300 may include exemplary steps to perform commands necessary for the system for AP availability 200 to carry out controller commanded function. A step 302 may include engagement of the commanded AP from an engagement command received by the controllers 112 122 132 from a flight crew member. In a monitoring phase, a step 304 may include monitor of the sensor suite 160 for disconnect factors. To enable collaboration between each of the installed AP systems, a step 306 may establish the AP crosstalk for AP controller collective decision making.

A query at a step 308 may decide if a sensor of the sensor suite 160 indicates to the controller the presence of a disconnect factor. If the result is negative, the logic returns to step 304 to monitor. If the result is positive, the logic may continue to a step 310 may to establish the AP hierarchy and, at a step 312, the controllers may reference the crosstalk for further factors associated with the hierarchy. Once the hierarchy is established, a step 314 may include engagement of the next AP channel on the hierarchy. Once the next AP system is engaged, the logic may return to step 304 to continuously monitor the sensor suite 160.

Figure 4:
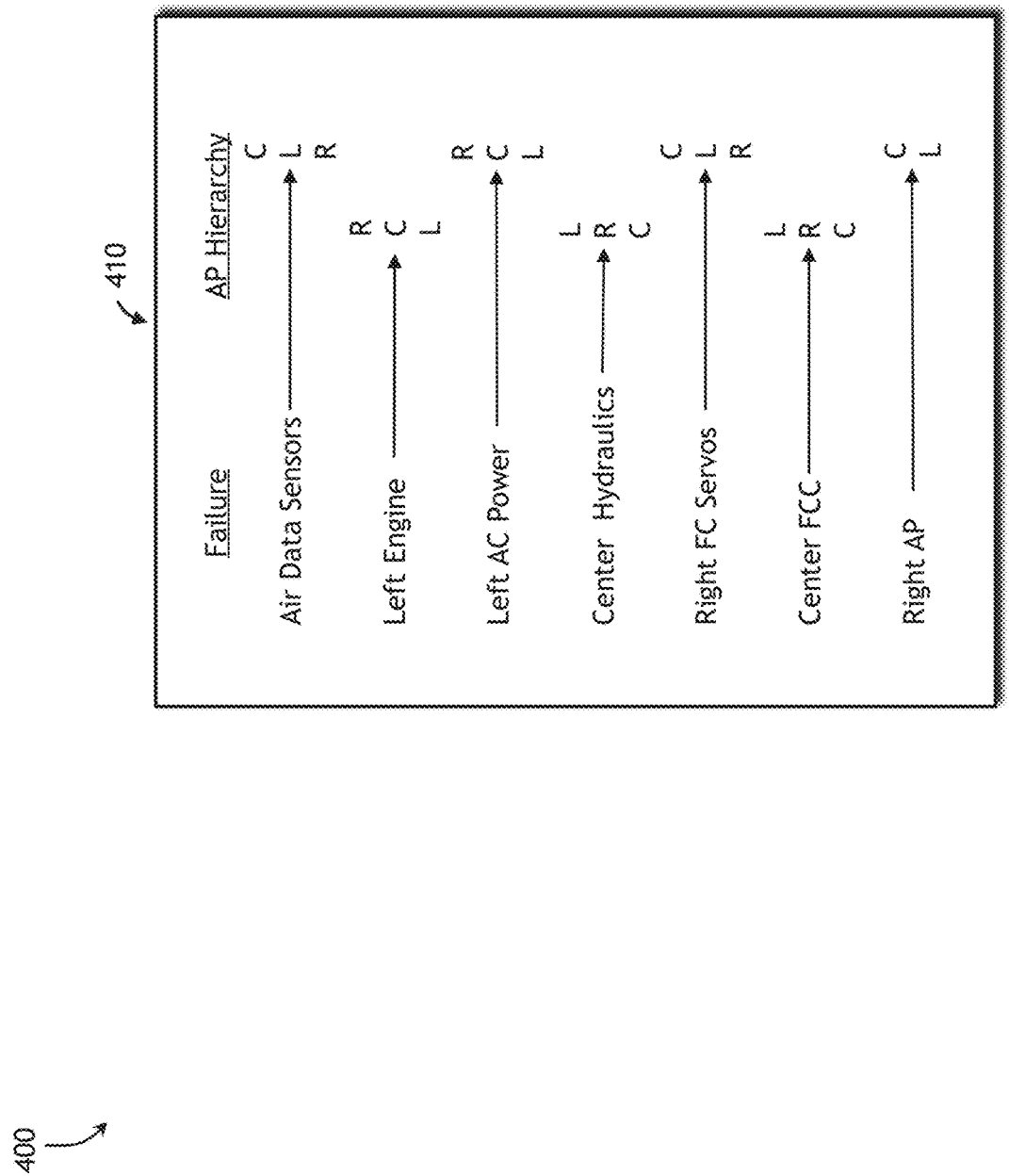
FIG. 4 is a diagram of an exemplary autopilot hierarchy in accordance with one embodiment of the inventive concepts disclosed herein.

FIG. 4 AP Hierarchy

Referring now to FIG. 4, a diagram of an exemplary autopilot hierarchy in accordance with one embodiment of the inventive concepts disclosed herein is shown. An exemplary AP hierarchy 400 may be indicated on table 410 showing a system failure on the left column with an associated AP hierarchy on the right.

AP Hierarchy Options

Hierarchy of AP availability may include a circular approach where the system 100 may engage the next AP in an order of [Left Center Right] or [Right Center Left]. In addition, the system for AP availability 200 may employ an AP scoring method via the crosstalk 150 to ensure the next AP in the hierarchy is the most stable or has the history of being the most accurate of the remaining AP channels onboard. In one embodiment of the inventive concepts disclosed herein, the system for AP availability 200 may base the AP hierarchy on aircraft systems remaining available for maximum safety of aircraft flight.

For example, should the left engine 170 (or left AC generator) fail, the right AP 130 may be at the top of the hierarchy for AP selection since the right AP 130 receives primary electrical power from the (still running) right engine 180 and the center 120 and left 110 AP both receive primary electrical power from the left engine 170. Similarly, should the center FCC fail or show signs of impending failure, the system for AP availability 200 may establish the AP hierarchy to include the left AP, right AP, and center AP as one exemplary AP hierarchy.

FIG. 5 Method

Figure 5:
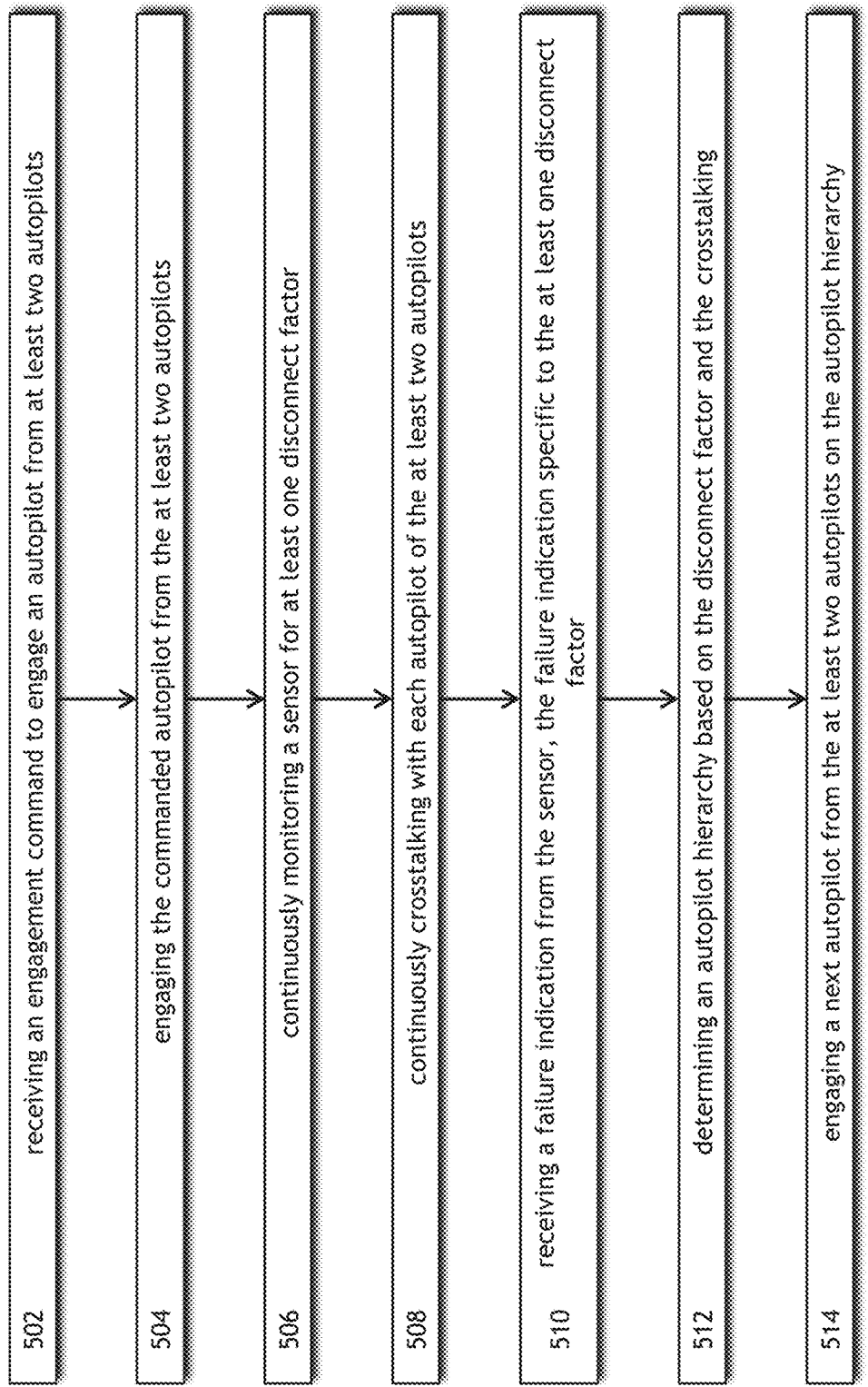
FIG. 5 is a diagram of a method flow for autopilot availability in accordance with one embodiment of the inventive concepts disclosed herein.

Referring now to FIG. 5, a diagram of a method flow for autopilot availability in accordance with one embodiment of the inventive concepts disclosed herein is shown. A diagram of a method 500 may include exemplary method steps to perform the method for AP availability. A step 502 may include receiving an engagement command to engage an autopilot from the available autopilots, each of the autopilots configured for manipulating a flight control surface onboard the aircraft. A step 504 may include engaging the commanded autopilot from the available autopilots. A step 506 may include continuously monitoring a sensor for a disconnect factor. A step 508 may include continuously crosstalking with each autopilot of the autopilots. A step 510 may include receiving a failure indication from the sensor, the failure indication specific to the disconnect factor. A step 512 may include determining an autopilot hierarchy based on the disconnect factor and the crosstalking. A step 514 may include engaging a next autopilot from the available autopilots on the autopilot hierarchy.

CONCLUSION

As will be appreciated from the above description, embodiments of the inventive concepts disclosed herein may provide a redundant and automatic autopilot engagement should a first autopilot system disconnect or fail.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for autopilot availability onboard an aircraft, comprising:
   at least two autopilots (AP) configured to manipulate at least one control surface onboard an aircraft;
   an AP controller associated with each AP of the at least two APs;
   each AP controller configured for a crosstalk with each of the other AP controllers;
   a sensor operatively coupled with each AP controller and configured to monitor at least one disconnect factor associated with the aircraft; and
   a tangible, non-transitory memory associated with each AP controller, the tangible, non-transitory memory having instructions stored therein that, in response to execution by the AP controller, cause the AP controllers collectively to:
   receive an engagement command;
   engage the commanded AP from the at least two APs;
   continuously monitor the sensor for the at least one disconnect factor;
   continuously crosstalk with the each of the other AP controllers;
   receive a failure indication from the sensor, the failure indication specific to the at least one disconnect factor;
   determine an AP hierarchy based on the disconnect factor and the crosstalk; and
   engage a next AP from the at least two APs on the AP hierarchy.

2. The system for autopilot availability onboard an aircraft of claim 1, wherein the at least one control surface onboard an aircraft further includes at least one of: an aileron, an elevator, an elevon, a rudder, a ruddervator, a roll trim device, a pitch trim device, a yaw trim device, a pitch of at least one main rotor, an angle of attack of at least one main rotor blade, a collective pitch supplied to a tail rotor, a direct jet thruster, a motor speed, a fan blade angle, a thrust vector angle, and a control function designed to influence a trajectory of the aircraft in at least one of a vertical direction, a horizontal direction, a lateral direction, a pitch, a roll, and a yaw.

3. The system for autopilot availability onboard an aircraft of claim 1, wherein the crosstalk further comprises a collective control of each AP onboard the aircraft, and a comparison of at least one of: an AP health, an AP consistency, an AP performance history, an active mode, an active target, and a status of an onboard interfacing system.

4. The system for autopilot availability onboard an aircraft of claim 1, wherein the sensor operatively coupled with each AP controller further comprises at least one of an air data sensor, an engine sensor, an electrical power sensor, a hydraulic pressure sensor, an inertial sensor, an attitude sensor, a flight control servo sensor, a flight control computer sensor, and an AP status sensor.

5. The system for autopilot availability onboard an aircraft of claim 1, wherein the at least one disconnect factor associated with the aircraft further comprises a failure in an aircraft system which causes one of the at least two APs to disconnect.

6. The system for autopilot availability onboard an aircraft of claim 1, wherein the engagement command further comprises a pilot commanded engagement command and a flight control computer generated engagement command.

7. The system for autopilot availability onboard an aircraft of claim 1, wherein the AP hierarchy based on the disconnect factor further comprises a hierarchy based on a maximized aircraft control.

8. The system for autopilot availability onboard an aircraft of claim 1, wherein the failure indication from the sensor further comprises a pending failure and a current failure.

9. The system for autopilot availability onboard an aircraft of claim 1, wherein engage the next AP from the at least two APs on the AP hierarchy further comprises alerting an operator via one of: illumination of a master caution light, sounding an audible alarm, displaying a message on a flight crew display, and transmitting an alert to a remote operator.

10. The system for autopilot availability onboard an aircraft of claim 1, wherein engage the next AP on the AP hierarchy further comprises an engagement of all available AP systems.

11. A method for autopilot availability onboard an aircraft, comprising:
    receiving an engagement command to engage an autopilot (AP) from at least two APs, each of the at least two APs configured for manipulating at least one flight control surface onboard the aircraft;
    engaging the commanded AP from the at least two APs;
    continuously monitoring a sensor for at least one disconnect factor;
    continuously crosstalking with each AP of the at least two APs;
    receiving a failure indication from the sensor, the failure indication specific to the at least one disconnect factor;
    determining an AP hierarchy based on the disconnect factor and the crosstalking; and
    engaging a next AP from the at least two APs on the AP hierarchy.

12. The method for autopilot availability onboard an aircraft of claim 11, wherein the at least one control surface onboard an aircraft further includes one: a control surface configured to deflect an airflow to impart a force on at least one portion of the aircraft, a pitch and blade angle of at least one rotor, a motor speed, and a thrust angle.

13. The method for autopilot availability onboard an aircraft of claim 11, wherein the crosstalking further comprises a collective control of each AP onboard the aircraft, and a comparison of at least one of: an AP health, an AP consistency, an AP performance history, an active mode, an active target, and a status of an onboard interfacing system.

14. The method for autopilot availability onboard an aircraft of claim 11, wherein the sensor operatively coupled with each AP controller further comprises at least one of an air data sensor, an engine sensor, an electrical power sensor, a hydraulic pressure sensor, an inertial sensor, an attitude sensor, a flight control servo sensor, a flight control computer sensor, and an AP status sensor.

15. The method for autopilot availability onboard an aircraft of claim 11, wherein continuously monitoring a sensor for at least one disconnect factor further comprises monitoring for a failure in an aircraft system which causes one of the at least two APs to disconnect.

16. The method for autopilot availability onboard an aircraft of claim 11, wherein engaging the commanded AP from the at least two APs further comprises engaging based on a pilot command, a remote operator command, and a flight control computer generated command.

17. The method for autopilot availability onboard an aircraft of claim 11, wherein determining an AP hierarchy based on the disconnect factor and the crosstalking further comprises a hierarchy based on a maximized aircraft control.

18. The method for autopilot availability onboard an aircraft of claim 11, wherein receiving a failure indication from the sensor further comprises receiving a pending failure and receiving a current failure.

19. The method for autopilot availability onboard an aircraft of claim 11, wherein engaging the next AP from the at least two APs on the AP hierarchy further comprises alerting an operator via one of: illumination of a master caution light, sounding an audible alarm, displaying a message on a flight crew display, and transmitting an alert to a remote operator.

20. The method for autopilot availability onboard an aircraft of claim 11, wherein engaging the next AP on the AP hierarchy further comprises an engagement of all available AP systems.

* * * * *